United States Patent
Behzad et al.

(10) Patent No.: US 8,774,327 B2
(45) Date of Patent: Jul. 8, 2014

(54) ADJUSTABLE RF RECEIVER

(75) Inventors: Arya Reza Behzad, Poway, CA (US); Michael S. Kappes, San Diego, CA (US); Jason A. Trachewsky, Menlo Park, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1715 days.

(21) Appl. No.: 11/079,961

(22) Filed: Mar. 15, 2005

(65) Prior Publication Data

US 2006/0171492 A1 Aug. 3, 2006

Related U.S. Application Data

(60) Provisional application No. 60/648,206, filed on Jan. 28, 2005.

(51) Int. Cl.
*H03D 1/00* (2006.01)

(52) U.S. Cl.
USPC ........... 375/343; 375/340; 375/316; 375/347; 375/349

(58) Field of Classification Search
USPC .................... 375/343, 340, 316, 347, 349
See application file for complete search history.

(56) References Cited

U.S. PATENT DOCUMENTS

| | | | | |
|---|---|---|---|---|
| 5,852,630 A * | 12/1998 | Langberg et al. | ............ | 375/219 |
| 7,280,804 B2 * | 10/2007 | Jacobsen et al. | ............ | 455/67.11 |
| 7,289,481 B2 * | 10/2007 | Wax et al. | ............ | 370/338 |
| 7,394,864 B2 * | 7/2008 | Webster et al. | ............ | 375/295 |
| 7,526,018 B2 * | 4/2009 | Seo et al. | ............ | 375/219 |
| 2002/0098819 A1 * | 7/2002 | Phang et al. | ............ | 455/260 |
| 2005/0047384 A1 * | 3/2005 | Wax et al. | ............ | 370/338 |
| 2005/0169398 A1 * | 8/2005 | Magee et al. | ............ | 375/267 |
| 2005/0286474 A1 * | 12/2005 | van Zelst et al. | ............ | 370/334 |
| 2006/0025101 A1 * | 2/2006 | Li | ............ | 455/323 |
| 2006/0072647 A1 * | 4/2006 | Feher | ............ | 375/130 |
| 2006/0146869 A1 * | 7/2006 | Zhang et al. | ............ | 370/465 |

* cited by examiner

*Primary Examiner* — Kenneth Lam
(74) *Attorney, Agent, or Firm* — Garlick & Markison; Kevin L. Smith

(57) ABSTRACT

The present invention provides adjusting of a radio frequency (RF) receiver that includes processing that begins by enabling an initial setting of the RF receiver, wherein the initial setting is based on a bandwidth of a channel of a plurality of channels. The processing continues by receiving an RF signal containing a preamble of a frame via one of the plurality of channels. The processing continues by converting the RF signal to a baseband signal based on the initial setting. The processing continues by determining channel type of the one of the plurality of channels based on the baseband signal. The processing continues by determining whether the channel type corresponds to the bandwidth of the initial setting. The processing continues by, when the channel type does not correspond to the bandwidth of the initial setting, adjusting setting of the RF receiver based on the channel type.

18 Claims, 8 Drawing Sheets

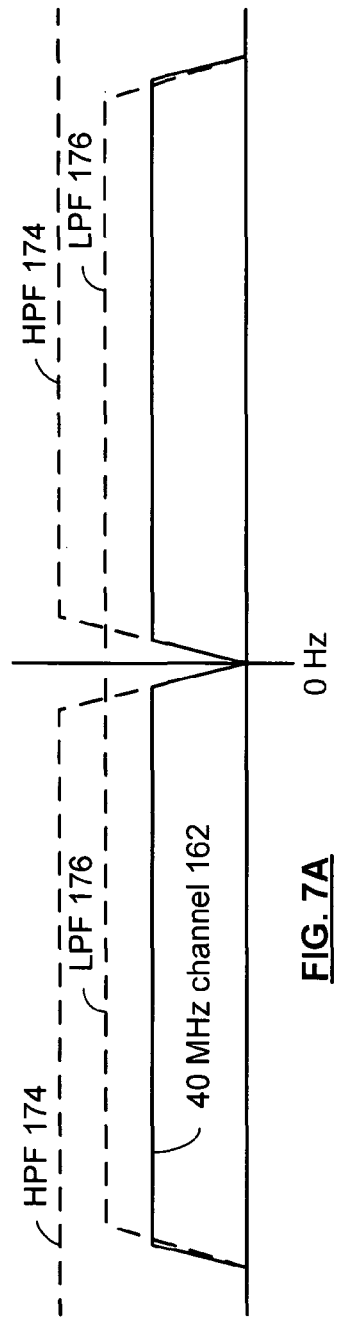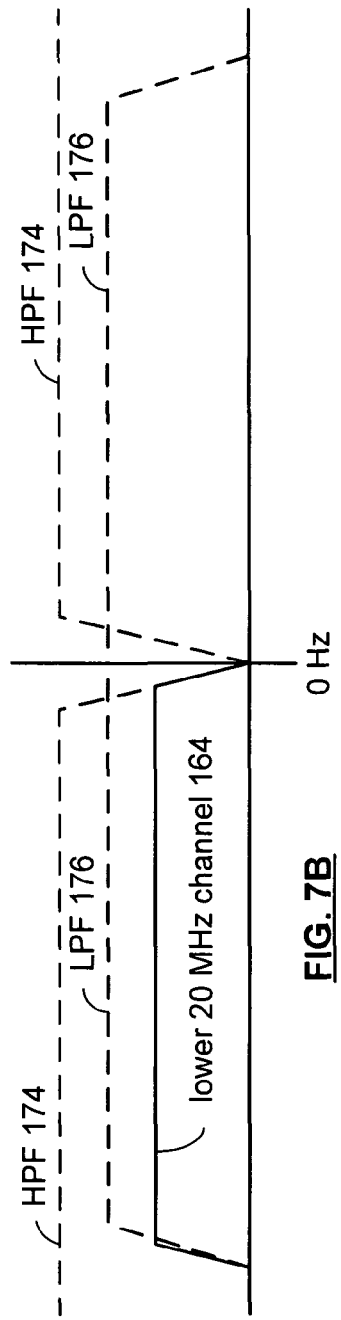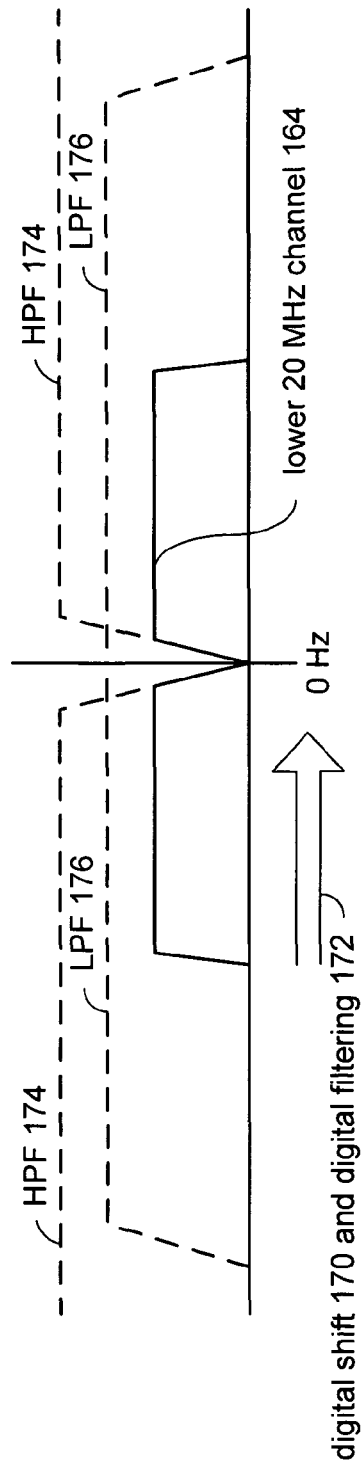

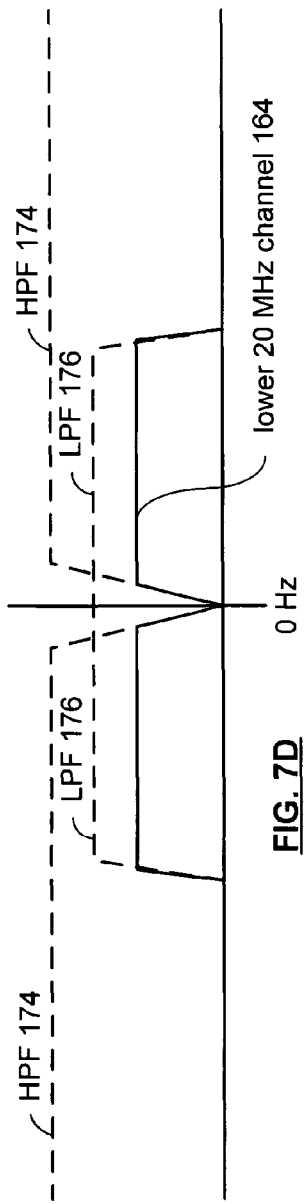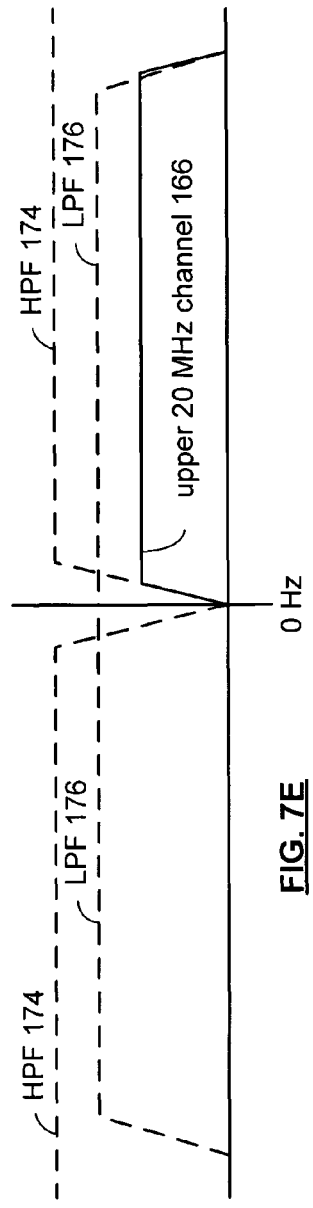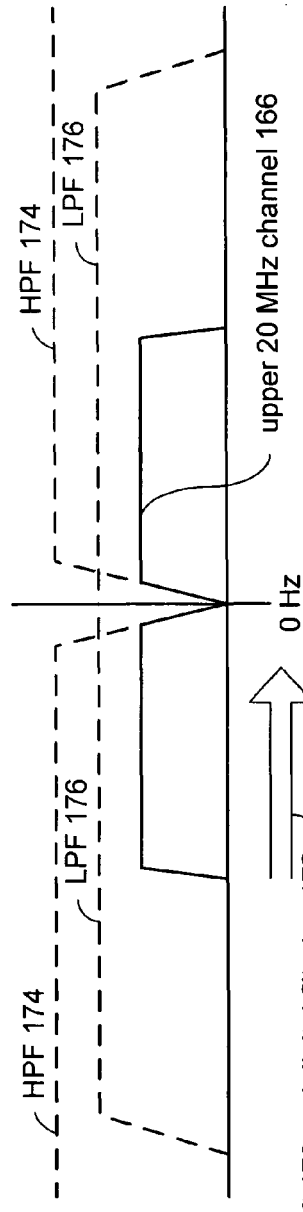

ADJUSTABLE RF RECEIVER

CROSS REFERENCE TO RELATED PATENTS

The present U.S. Utility Patent Application claims priority pursuant to 35 U.S.C. §119(e) to U.S. Provisional Patent Applications 60/648,206, entitled "Adjustable RF Receiver," filed Jan. 28, 2005, expired, which is hereby incorporated herein by reference in its entirety and made part of the present U.S. Utility Patent Application for all purposes.

BACKGROUND OF THE INVENTION

1. Technical Field of the Invention

This invention relates generally to wireless communication systems and in particular to an adjustable radio frequency receiver used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

In addition to the different type of wireless communications (e.g., SISO, SIMO, MISO, and MIMO), the channel bandwidth varies from standard to standard. For example, IEEE 802.11 (j) prescribes a 10 MHz channel bandwidth, IEEE 802.11(a) and (g) prescribe a 20 MHz channel, and IEEE 802.11(n) is contemplating a channel bandwidth of 20 MHz or 40 MHz. Accordingly, for a radio to be compliant with one or more of these standards, the RF receiver must be adjustable to accommodate the different channel bandwidths.

Therefore, a need exists for a method and apparatus for adjusting a radio frequency (RF) receiver to accommodate various channel bandwidths.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 7A-7F are a series of diagrams of adjusting an RF receiver for channels having differing channel types in accordance with the present invention.

DETAILED DESCRIPTION OF THE INVENTION

Figure 1:
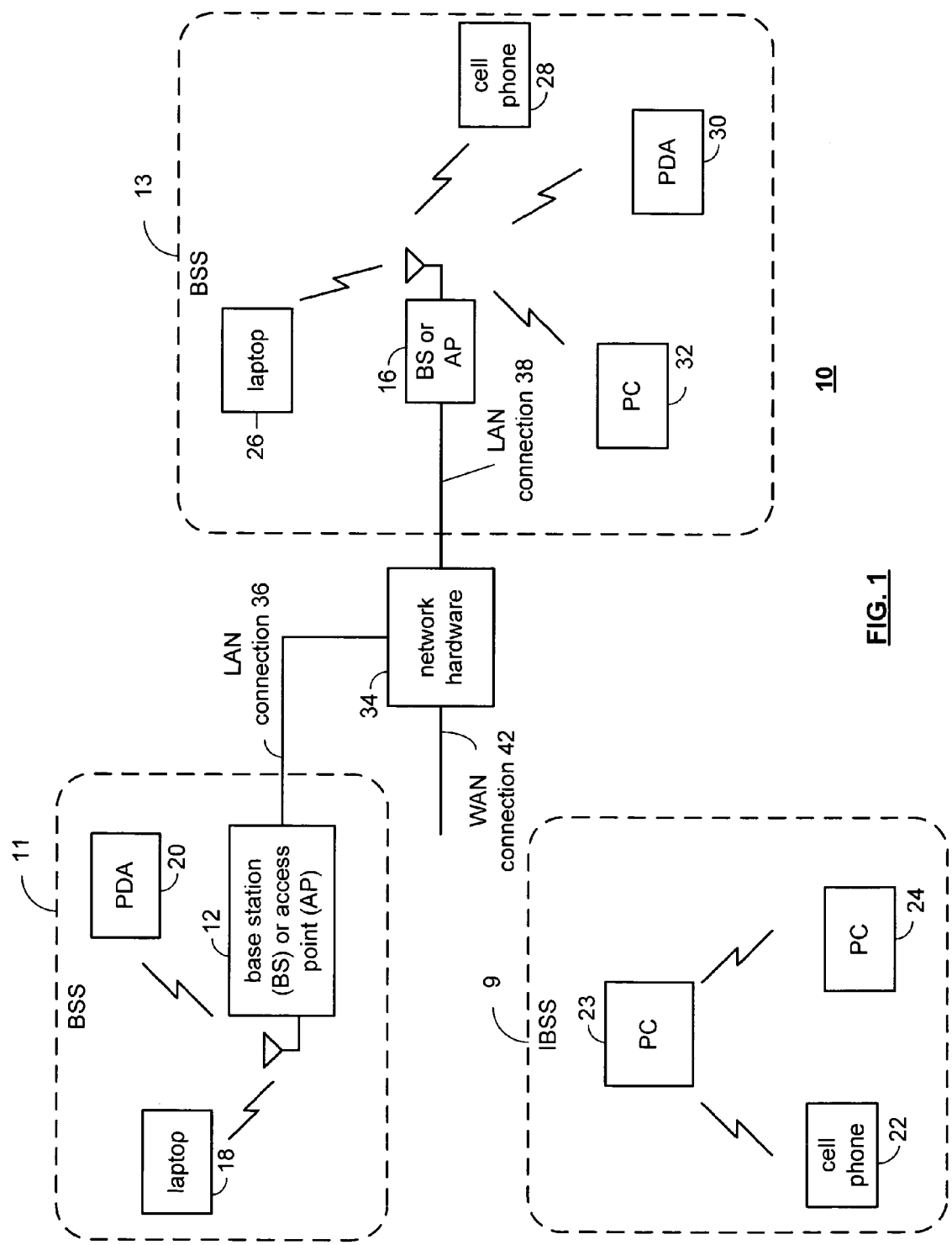
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
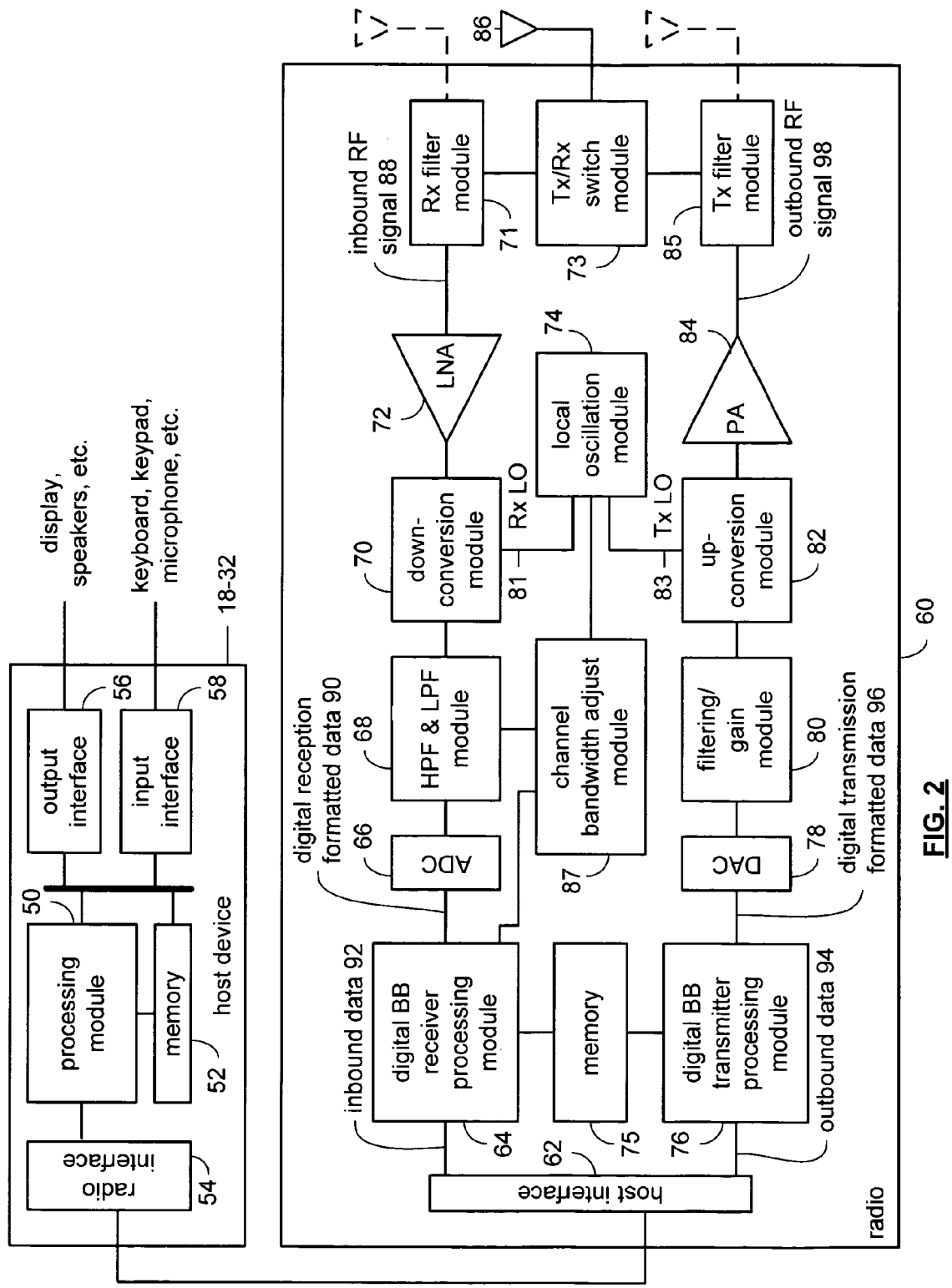
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
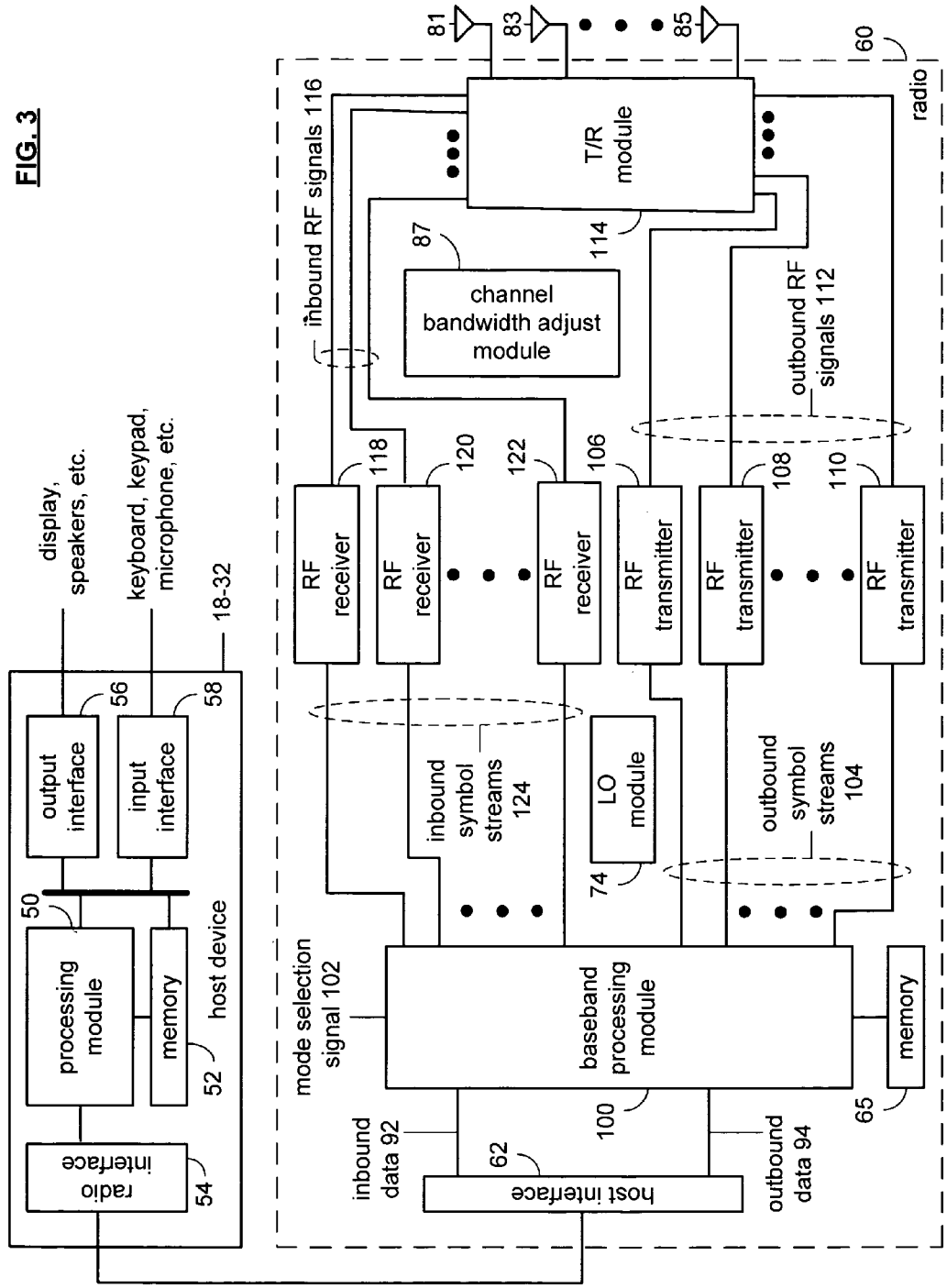
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122, which will be described in greater detail with reference to FIG. 4. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
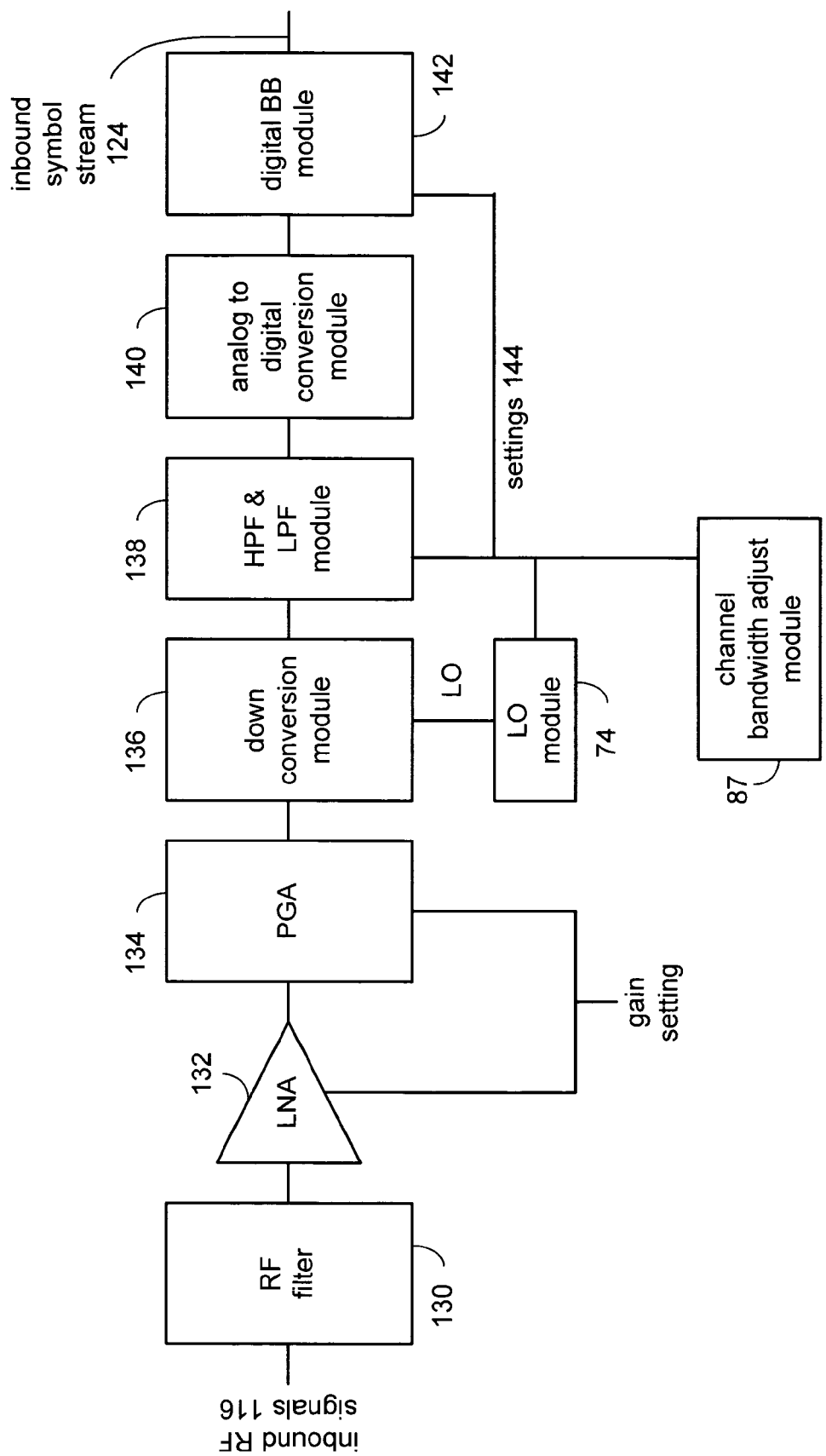
FIG. 4 is a schematic block diagram of a radio frequency receiver of the wireless communication device of FIG. 3.

FIG. 4 is a schematic block diagram of each of the RF receivers 118-120 coupled to the channel bandwidth adjust module 87. In this embodiment, each of the RF receivers 118-120 includes an RF filter 130, a low noise amplifier (LNA) 132, a programmable gain amplifier (PGA) 134, a down-conversion module 136, a high pass and low pass filter module 136, an analog-to-digital conversion module 140, and a digital baseband (BB) module 142. The RF filter 130, which may be a high frequency bandpass filter, receives the inbound RF signals 116 and filters them to produce filtered inbound RF signals. The low noise amplifier 132 amplifies the filtered inbound RF signals based on a gain setting and provides the amplified signals to the programmable gain amplifier 134. The programmable gain amplifier 134 further amplifies the inbound RF signals before providing them to the down-conversion module 136.

The down-conversion module 136 includes a pair of mixers, a summation module, and a filter to mix the inbound RF signals with a local oscillation (LO) that is provided by the local oscillation module 74 to produce analog baseband signals. The high pass and low pass filter module 138, based on settings 144 from the channel baseband adjust module 87, filters the analog baseband signals and provides them to the analog-to-digital conversion module 140 which converts them into digital signals. The digital filter and down-sampling module 113, based on settings 144 from the channel baseband adjust module 87, filters and down samples the digital signals and then adjusts the sampling rate to produce the inbound symbol stream 96. As an alternative to adjusting the filtering of the high pass and low pass filter module 138 and digital baseband module 142, the channel baseband adjust module 87 may provide the settings to the LO module 74 to adjust the local oscillation provided to the down conversion module 136 to adjust for differing channel bandwidths.

Figure 5:
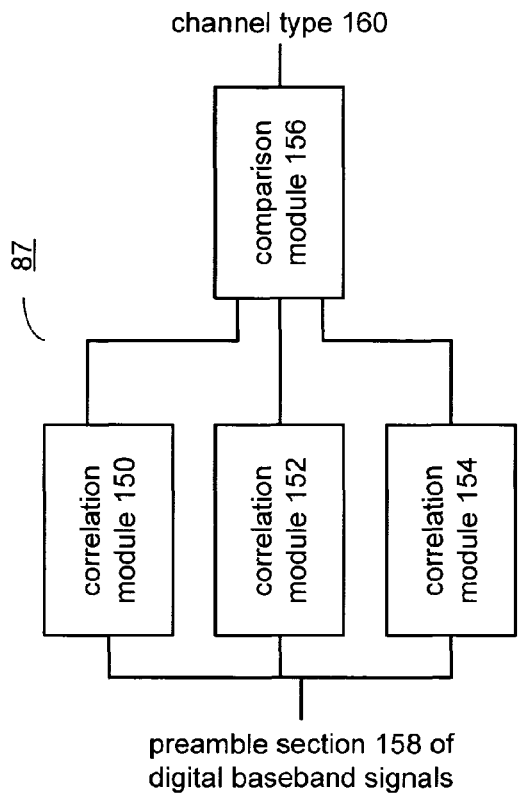
FIG. 5 is a schematic block diagram of a channel bandwidth adjust module in accordance with the present invention.

FIG. 5 is a schematic block diagram of an embodiment of the channel bandwidth adjust module 87 that includes a plurality of correlation modules 150-154 and a comparison module 156. Each of the correlation modules 150-154 may be a self correlation module, a cross correlation module, or a matched filter. In one embodiment, the correlation modules 150-154 are programmed to test the preamble section 158 of the digital baseband signals for channel having differing bandwidths. For example, correlation module 150 may be programmed to test for a known preamble of a frame for a 40 MHz channel, correlation module 152 may be programmed to test for a known preamble of a frame for an upper 20 MHz channel, and correlation module 154 may be programmed to test for a known preamble of a frame for a lower 20 MHz channel. In such an embodiment, the 40 MHz channel may include the upper and lower 20 MHz channels.

The comparison module 156 compares the correlation outputs of each of the correlation modules 150-154 to determine which module 154 is providing the best correlation results. Typically, the comparison module 156 will use the correlation output of the correlation module providing the best results to indicate the channel type 160. However, the comparison module 156 may incorporate additional information to determine the channel type 160. The bandwidth channel adjust module 87 utilizes the channel type 160 to determine the settings 144 for adjusting the RF receiver as will be described below with reference to FIGS. 6-8.

Figure 6:
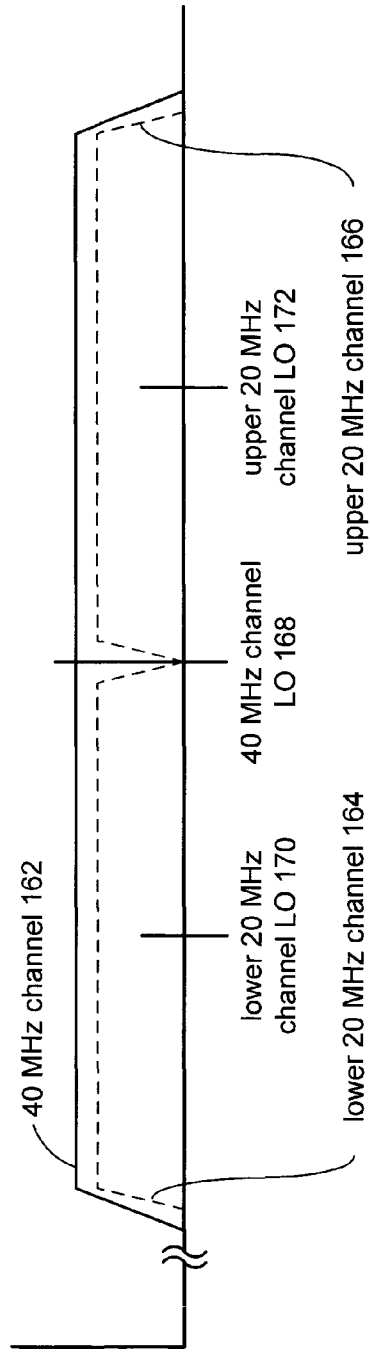
FIG. 6 is a diagram of channels of differing bandwidths in accordance with the present invention.

FIG. 6 is a diagram of channels having differing bandwidths at RF frequencies. In this illustration, a 40 MHz channel 162 is centered at an RF frequency corresponding to a 40 MHz channel local oscillation 168 for a direct conversion receiver; a lower 20 MHz channel 164 is centered at an RF frequency corresponding to a lower 20 MHz channel local oscillation 170 for a direct conversion receiver; and an upper 20 MHz channel 166 is centered at an RF frequency corresponding to an upper 20 MHz channel local oscillation 172 for a direct conversion receiver. As an example, the three channels may be in accordance with channel definitions as provided in the IEEE 802.11 n standard, where, for a specific example, the 40 MHz channel 162 is centered at an RF frequency of 5.19 GHz, the lower 20 MHz channel is centered at an RF frequency of 5.18 GHz, and the upper 20 MHz channel is centered at an RF frequency of 5.20 GHz. As is shown, the 40 MHz channel 162 includes the frequency spectrum of the lower and upper 20 MHz channels 164 and 166.

In one embodiment, the initial settings may correspond to the 40 MHz channel 162 such that the local oscillation module 74 is set to produce a local oscillation corresponding to the 40 MHz channel local oscillation 168 (e.g., 5.19 GHz), the high pass and low pass filter module 68 and/or 138 is set to have a filter response corresponding to the 40 MHz channel, and/or the digital baseband module 64 or 138 is set to have a digital filtering and/or digital shifting corresponding to the 40 MHz channel 162. The high pass and low pass filtering and the digital filtering and/or shifting will be discussed in greater detail with reference to FIG. 7.

Once the channel type is determined as previously described with reference to FIG. 5, the channel bandwidth adjust module 87 adjusts the settings of the RF receiver if the channel type is different than the channel type corresponding to the initial settings. In this example, if the channel type is the lower or upper channel 164 or 166, the channel bandwidth adjust module 87 adjusts the settings of the local oscillation module 74, the high pass filtering, the low pass filtering, the digital filtering, and/or the digital shifting. In one embodiment, the channel bandwidth adjust module 87 may adjust the settings of the local oscillation module 74 such that the local oscillation corresponds to the lower or upper 20 MHz channel local oscillation 170 or 172. In this embodiment, the channel bandwidth adjust module 87 may also adjust the high pass filtering, the low pass filtering, and/or the digital filtering, but would not adjust the settings of the digital shifting.

In another embodiment, the channel bandwidth adjust module 87 would not adjust the local oscillation setting from the initial setting (e.g., leave it at 5.19 GHz—the example 40 MHz channel local oscillation), but would adjust the digital shifting and may adjust one or more of the high pass filtering, the low pass filtering, and the digital filtering. As one of ordinary skill in the art will appreciate, there are numerous ways to adjust the settings of the RF receiver and that the settings of the RF receiver may be adjusted to accommodate more than three different channel types.

FIGS. 7A-7F are a series of diagrams of adjusting an RF receiver for channels having differing channel types when the local oscillation remains at its initial setting. FIG. 7A is a diagram of filtering a 40 MHz channel, wherein the initial settings of the RF receiver correspond to the 40 MHz channel. In this example, the 40 MHz channel is a complex signal that has been high pass filtered 174 and low pass filtered 176 in the analog domain prior to being converted to the digital domain. In the digital domain, with the 40 MHz channel being the basis for the initial settings, the 40 MHz channel is not digital shifted, but may be digitally filtered.

FIG. 7B illustrates the lower 20 MHz channel 164 after being down converted to baseband in accordance with the initial settings still in place, i.e., the local oscillation, the high pass filtering 174, the low pass filter 176, the digital shifting 170, and the digital filtering 172 are all set for the 40 MHz channel. As such, the lower 20 MHz channel 164 is centered at a frequency below zero.

FIG. 7C illustrates the lower 20 MHz channel 164 being digitally shifted 170 to be centered at zero. Since, in the digital domain, the lower 20 MHz channel is a complex signal it can be digitally shifted to be centered at zero by mixing the digital representation of the lower 20 MHz channel with a complex sinusoidal signal having a frequency that represents the different between the 40 MHz channel local oscillation and the lower 20 MHz channel local oscillation. The digital filtering 172 may be adjusted from the 40 MHz channel setting to a 20 MHz channel setting. In one embodiment, the digital filtering 172 is a bandpass filter.

FIG. 7D illustrates the adjusting of the high pass filtering 174 and/or the low pass filtering 176 after the lower 20 MHz channel 164 has been digitally shifted to be centered at zero. In this example, the corner frequency of the low pass filtering 176 is adjusted from the 40 MHz channel setting to a 20 MHz channel setting. In addition, the order of the low pass filtering 176 and/or high pass filtering 174 may be adjusted to accommodate different standard requirements. For instance, IEEE 802.11 n has a sharper edge requirement than IEEE 802.11a, which would require the order of the high pass and low pass filtering 174 and 176 to be adjusted.

FIG. 7E illustrates the upper 20 MHz channel 16 after being down converted to baseband in accordance with the initial settings still in place, i.e., the local oscillation, the high pass filtering 174, the low pass filter 176, the digital shifting 170, and the digital filtering 172 are all set for the 40 MHz channel. As such, the upper 20 MHz channel 164 is centered at a frequency above zero.

FIG. 7F illustrates the upper 20 MHz channel 166 being digitally shifted 170 to be centered at zero. Since, in the digital domain, the upper 20 MHz channel is a complex signal it can be digitally shifted to be centered at zero by mixing the digital representation of the upper 20 MHz channel with a complex sinusoidal signal having a frequency that represents the different between the 40 MHz channel local oscillation and the lower 20 MHz channel local oscillation. The digital filtering 172 may be adjusted from the 40 MHz channel setting to a 20 MHz channel setting. In one embodiment, the digital filtering 172 is a bandpass filter. At this point, the high pass and low pass filtering 174 and 176 may be adjusted as described with reference to FIG. 7D.

Figure 8:
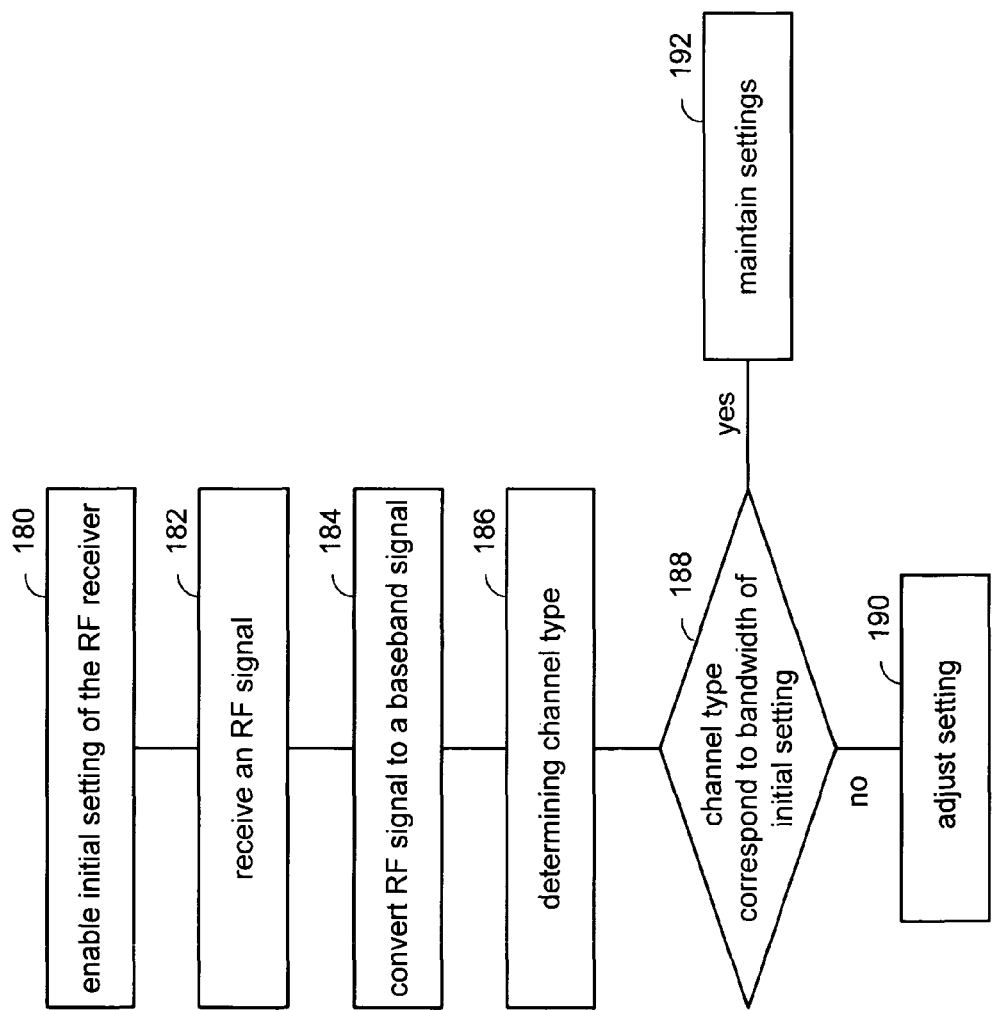
FIG. 8 is a logic diagram of a method for adjusting a radio frequency receiver in accordance with the present invention.

FIG. 8 is a logic diagram of a method for adjusting a radio frequency receiver. The processing begins at step 180 where an initial setting of the RF receiver is enabled, where the initial setting is based on a bandwidth of a channel of a plurality of channels. For example, the initial setting is based on a 40 MHz channel. The process then proceeds to step 182 where the RF receiver receives an RF signal containing a preamble of a frame via one of the plurality of channels. The process continues at step 184 where the RF receiver converts the RF signal to a baseband signal based on the initial setting.

The process then proceeds to step 186 where the RF receiver determines channel type of the one of the plurality of channels based on the baseband signal. In one embodiment, this may be done by performing a correlation function upon the preamble portion of the baseband signal for each of the plurality of channels to produce a plurality of correlation results, and determining the channel type based on the plurality of correlation results. An example of determining the channel type was provided with reference to FIG. 5.

The process then proceeds to step 188 where the RF receiver determines whether the channel type corresponds to the bandwidth of the initial setting. For example, if the initial setting is based on a 40 MHz channel, the RF receiver is determining whether the channel type of the present channel is a 40 MHz channel. If yes, the process proceeds to step 192 where the RF receiver maintains the initial setting(s).

If the channel type does not correspond to the bandwidth of the initial setting, the process proceeds to step 190 where the RF receiver adjusts the setting of the RF receiver based on the channel type. The adjusting the setting may include one or more of: digitally shifting the baseband signal based on the channel type to produce a shifted baseband signal; digitally filtering the shifted baseband signal; adjusting a high pass filter of the RF receiver based on the channel type; adjusting a low pass filter of the RF receiver based on the channel type; down sampling frequency of the baseband signal based on a ratio of bandwidth of the one of the plurality of channels and the bandwidth of the channel of a plurality of channels; and adjusting a local oscillation from a frequency corresponding to the channel of the plurality of channels to a frequency corresponding to the one of the plurality of channels.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for adjusting an RF receiver to accommodate channels of differing channel types. As one of ordinary skill in the art will appreciate, other embodiments may be derived from the teachings of the present invention without deviating from the scope of the claims.

What is claimed is:

1. A method for adjusting a radio frequency (RF) receiver, the method comprising:
    enabling an initial setting of the RF receiver, wherein the initial setting is based on a bandwidth of a channel of a plurality of channels;
    receiving an RF signal containing a preamble of a frame via one of the plurality of channels;
    converting the RF signal to a baseband signal based on the initial setting;
    determining channel type of the one of the plurality of channels based on the baseband signal, and, based on the channel type:
        digitally shifting the baseband signal to produce a shifted baseband signal;
        digitally filtering the shifted baseband signal;
        adjusting a high pass filter of the RF receiver; and
        adjusting a low pass filter of the RF receiver;
    determining whether the channel type corresponds to the bandwidth of the initial setting; and
    when the channel type does not correspond to the bandwidth of the initial setting, adjusting setting of the RF receiver based on the channel type.

2. The method of claim 1, wherein the determining the channel type comprising:
    performing a correlation function upon a preamble portion of the baseband signal for each of the plurality of channels to produce a plurality of correlation results; and
    determining the channel type based on the plurality of correlation results.

3. The method of claim 1 further comprising:
    down sampling frequency of the baseband signal based on a ratio of bandwidth of the one of the plurality of channels and the bandwidth of the channel of a plurality of channels.

4. The method of claim 1, wherein the adjusting the setting of the RF receiver comprising:

adjusting a local oscillation from a frequency corresponding to the channel of the plurality of channels to a frequency corresponding to the one of the plurality of channels.

5. The method of claim 1, wherein the channel type comprising at least one of:
an upper 20 MHz channel type;
a lower 20 MHz channel type; and
a 40 MHz channel type.

6. A radio frequency (RF) receiver comprises:
low noise amplifier operably coupled to amplify inbound RF signals to produce amplified inbound RF signals, wherein the inbound RF signals are received via one of a plurality of channels;
down conversion module operably coupled to convert the amplified inbound RF signals into baseband signals based on a local oscillation;
a high pass filter section operably coupled to high pass filter the baseband signals based on an initial setting to produce high pass filtered baseband signals;
a low pass filter section operably coupled to low pass filter the high pass filtered baseband signals based on the initial setting to produce filtered baseband signals;
analog to digital conversion section operably coupled to convert the filtered baseband signals into digital baseband signals;
digital baseband module operably coupled to convert, based on the initial setting, the digital baseband signals into data signals; and
a channel bandwidth adjust module operably coupled to:
determine a channel type of the one of the plurality of channels based on the digital baseband signal to produce a determined channel type;
determine whether the determined channel type differs from a channel type corresponding to the initial setting; and
when the determined channel type differs from the channel type corresponding to the initial setting, adjust, based on the determined channel type, settings of at least one of the digital baseband module, the high pass filter section, and the low pass filter section to accommodate the determined channel type.

7. The RF receiver of claim 6, wherein the channel bandwidth adjust module comprises:
a plurality of correlation modules operably coupled to perform correlation functions on a preamble section of the digital baseband signals to produce a plurality of correlation results, wherein each of the plurality of channels corresponds to a unique one of the correlation functions; and
comparison module operably coupled to determine the channel type based on the plurality of correlation results.

8. The RF receiver of claim 6, wherein the digital baseband module further functions to:
digitally shift the digital baseband signal based on the determined channel type in accordance with the adjusting of the settings to produce a shifted baseband signal; and
digitally filter the shifted baseband signal.

9. The RF receiver of claim 8, wherein the digital baseband module further functions to:
down sample frequency of the shifted baseband signal based on a ratio of bandwidth of the one of the plurality of channels and the bandwidth of the channel of a plurality of channels.

10. The RF receiver of claim 6, wherein the channel bandwidth adjust module further functions to adjust the settings by:
adjusting the local oscillation from a frequency corresponding to the channel of the plurality of channels to a frequency corresponding to the one of the plurality of channels.

11. The RF receiver of claim 6, wherein the channel type comprising at least one of:
an upper 20 MHz channel type;
a lower 20 MHz channel type; and
a 40 MHz channel type.

12. The RF receiver of claim 11, wherein each of the channel types are centered about a different RF frequency.

13. A Wireless Local Area Network (WLAN) apparatus for adjusting a radio frequency (RF) receiver, the apparatus comprises:
processing module; and
memory operably coupled to the processing module, wherein the memory stores operational instructions that cause the processing module to:
enable an initial setting of the RF receiver, wherein the initial setting is based on a bandwidth of a channel of a plurality of channels;
receive an RF signal containing a preamble of a frame via one of the plurality of channels;
convert the RF signal to a baseband signal based on the initial setting;
determine channel type of the one of the plurality of channels based on the baseband signal to produce a determined channel type;
determine whether the determined channel type differs from a channel type corresponding to the initial setting; and
when the channel type differs from the channel type corresponding to the initial setting, adjust setting of the RF receiver based on the determined channel type.

14. The WLAN apparatus of claim 13, wherein the memory comprises operational instructions that cause the processing module to determine the channel type by:
performing a correlation function upon the preamble portion of the baseband signal for each of the plurality of channels to produce a plurality of correlation results; and
determining the channel type based on the plurality of correlation results.

15. The WLAN apparatus of claim 13, wherein the memory comprises operational instructions that cause the processing module to adjust the setting of the RF receiver by:
digitally shifting the baseband signal based on the channel type to produce a shifted baseband signal; and
digitally filtering the shifted baseband signal.

16. The WLAN apparatus of claim 15, wherein the memory comprises operational instructions that cause the processing module to adjust at least one of:
a high pass filter of the RF receiver based on the channel type; and a low pass filter of the RF receiver based on the channel type.

17. The WLAN apparatus of claim 13, wherein the memory comprises operational instructions that cause the processing module to:
down sample frequency of the baseband signal based on a ratio of bandwidth of the one of the plurality of channels and the bandwidth of the channel of a plurality of channels.

18. The WLAN apparatus of claim 13, wherein the memory comprises operational instructions that cause the processing module to adjust the setting of the RF receiver by:
    adjusting a local oscillation from a frequency corresponding to the channel of the plurality of channels to a frequency corresponding to the one of the plurality of channels.

* * * * *

UNITED STATES PATENT AND TRADEMARK OFFICE
CERTIFICATE OF CORRECTION

| | | |
|---|---|---|
| PATENT NO. | : 8,774,327 B2 | Page 1 of 1 |
| APPLICATION NO. | : 11/079961 | |
| DATED | : July 8, 2014 | |
| INVENTOR(S) | : Behzad et al. | |

It is certified that error appears in the above-identified patent and that said Letters Patent is hereby corrected as shown below:

On the title page:

Under Abstract should read:

"20 Claims, 8 Drawing Sheets"

In the claims:

After claim 18, ADD:

19. The WLAN apparatus of claim 13, wherein the channel type comprising at least one of:
    an upper 20 MHz channel type;
    a lower 20 MHz channel type; and
    a 40 MHz channel type.

20. The WLAN apparatus of claim 19, wherein each of the channel types are centered about a different RF frequency.

Signed and Sealed this
Sixteenth Day of February, 2016

Michelle K. Lee
*Director of the United States Patent and Trademark Office*